(12) United States Patent
Lam

(10) Patent No.: US 9,599,840 B2
(45) Date of Patent: Mar. 21, 2017

(54) GLASSES LEG SPRING HINGE STRUCTURE

(71) Applicant: FOUR-DIMENSION DESIGN STUDIO LIMITED, Hong Kong (HK)

(72) Inventor: Edwin Lam, Hong Kong (HK)

(73) Assignee: Four-Dimension Design Studio Ltd., Hong Kong (HK)

( * ) Notice: Subject to any disclaimer, the term of this patent is extended or adjusted under 35 U.S.C. 154(b) by 0 days.

(21) Appl. No.: 14/818,454

(22) Filed: Aug. 5, 2015

(65) Prior Publication Data
US 2017/0038602 A1    Feb. 9, 2017

(51) Int. Cl.
*G02C 5/22* (2006.01)

(52) U.S. Cl.
CPC ......... *G02C 5/2209* (2013.01); *G02C 5/2218* (2013.01); *G02C 2200/22* (2013.01)

(58) Field of Classification Search
CPC ........ G02C 5/146; G02C 5/22; G02C 5/2209; G02C 5/2218; G02C 5/2254; G02C 2200/22

USPC ............................ 351/113, 114, 153; 16/228
See application file for complete search history.

(56) References Cited

U.S. PATENT DOCUMENTS

| | | | |
|---|---|---|---|
| 2013/0033675 A1* | 2/2013 | Cheong ................ | G02C 5/2209 351/153 |
| 2015/0070648 A1* | 3/2015 | Chang ..................... | G02C 1/08 351/153 |

* cited by examiner

*Primary Examiner* — Huy K Mai

(57) ABSTRACT

The present invention relates to a glasses leg spring hinge structure, comprising a glasses leg, plurality of metal rings, a rotating shaft, a leaf spring and a mounting head, wherein the metal rings are fixedly connected to a head of the glasses leg, wherein the rotating shaft is arranged in the metal rings, wherein the leaf spring is arranged at the head of the glasses leg, wherein the leaf spring is located below the rotating shaft, wherein a rotating shaft groove is formed in a side surface of the rotating shaft, wherein the mounting head is T-shaped and wherein a head of the mounting head is inserted into the rotating shaft groove.

2 Claims, 3 Drawing Sheets

GLASSES LEG SPRING HINGE STRUCTURE

FIELD OF INVENTION

The present invention relates to a novel glasses leg spring hinge structure in the field of glasses production and manufacturing.

BACKGROUND

At present, a glasses leg hinge is one of parts of glasses and plays a role of connecting a glasses leg with a glasses frame. Glasses leg hinges are usually divided into two types, wherein one type is spring hinges which can produce elastic force, and the other type is common counterpart hinges which cannot produce elastic force. The existing glasses leg spring hinges are realized through two manners, wherein one manner is to directly weld a spring hinge at the position of the glasses leg, and the other manner is to widen and thicken the glasses leg, then break and drill the glasses leg and finally mount a spring core in the glasses leg. After these two types of spring hinge structures are used for a long term, the elastic force is weakened and the use of glasses is influenced. In addition, since an additional spring hinge is welded and the thickness and the width of the glasses leg are increased in order to mount the spring core, the glasses leg becomes thicker and larger, not only is the attractiveness of the entire pair of glasses frame influenced, but also the weight of the entire pair of glasses frame is increased, and the glasses wearing comfort of consumers is influenced. Moreover, these structures are complex, the needed manufacturing processes are more and the manufacturing cost of glasses is increased.

SUMMARY OF THE INVENTION

In order to solve the technical problem existing in the prior art, the present invention provides a glasses leg spring hinge structure which is reasonable in structure design and can maintain better elastic force and appearance of a glasses leg.

In order to realize the above-mentioned purposes, the technical solution adopted by the present invention is that a novel glasses leg spring hinge structure comprises a glasses leg, metal rings, a rotating shaft, a leaf spring and a mounting head, wherein the metal rings are fixedly connected to a head of the glasses leg, the rotating shaft is arranged in the metal rings, the leaf spring is arranged at the head of the glasses leg, the leaf spring is located below the rotating shaft, a rotating shaft groove is formed in a side surface of the rotating shaft, the mounting head is T-shaped and a head of the mounting head is inserted into the rotating shaft groove.

Preferably, metal ring grooves are formed in the metal rings.

Preferably, a gap exists between the leaf spring and the glasses leg.

Preferably, a mounting head end surface is matched with the rotating shaft groove, and the width of a mounting head main body is equal to the depth of the rotating shaft groove.

Preferably, a mounting head upper body is connected with a glasses frame.

Preferably, the width of the head of the mounting head is equal to the width of the rotating shaft groove.

In the present invention, the spring hinge structure comprises the mounting head, the rotating shaft and the glasses leg, wherein the metal rings are arranged on two sides of a tail end of the glasses leg, the rotating shaft is arranged in the metal rings, the rotating shaft groove is formed in the rotating shaft, and the head of the mounting head is matched with the rotating shaft groove and can be just inserted into the rotating shaft groove. When the mounting head, the rotating shaft groove and the metal ring grooves are in a line, the head of the mounting head can be inserted into the rotating shaft groove. Once the mounting head is rotated such that the rotating shaft groove and the metal rings are not in a line, the mounting head cannot be taken out. A section of the rotating shaft is provided with three edges, and by inserting the mounting head into the rotating shaft groove to fix the direction of the edges of the rotating shaft, the directions of outward elastic force and inward elastic force of the glasses leg are guaranteed. Since the width of the head of the mounting head, the width of the rotating shaft groove and the width of the head of the glasses leg are mutually matched and the metal rings and the leaf spring of the glasses leg are specially designed, the mounting head, the rotating shaft and the glasses leg can be smoothly assembled and do not get loose and fall off. In addition, the elastic force is produced in such a manner that the leaf spring of the glasses leg is subjected to a force.

Compared with the prior art, the present invention has the following technical effects: since the rotating shaft in the present invention is arranged in the metal rings of the glasses leg, then the mounting head is mounted in the rotating shaft, the connection is realized through a position relation between grooves in the rotating shaft and the metal rings and the leaf spring is arranged below the rotating shaft to cause certain elastic force to the rotating shaft, the elastic force does not disappear with use, the structure is simple and the glasses leg becomes more attractive.

DETAILED DESCRIPTION

In order to enable the technical problem to be solved by the present invention, the technical solution and the beneficial effects to be clearer, the present invention will be described below in detail in combination with the drawings and the embodiments. It should be understood that the embodiments described herein are only used for explaining the present invention instead of limiting the present invention.

Figure 1:
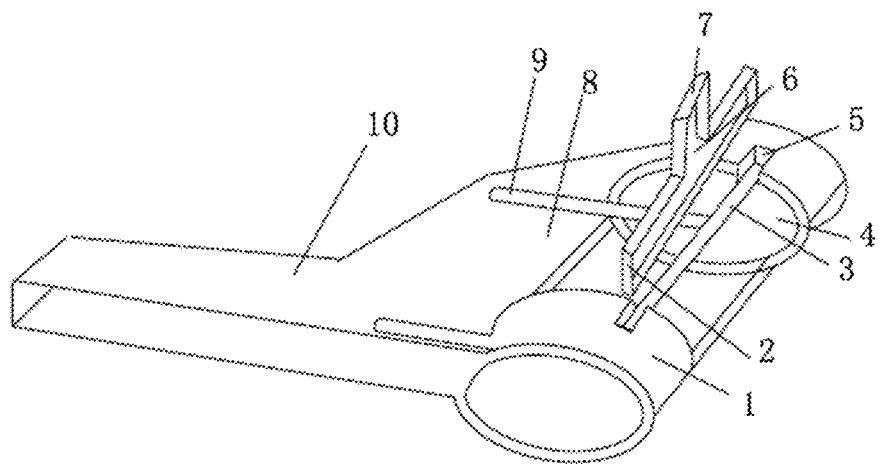
FIG. 1 is a structural schematic view of the embodiment of the present invention.

A novel glasses leg spring hinge structure as shown in FIG. 1 comprises a glasses leg 10, metal rings 1, a rotating shaft 4, a leaf spring 8 and a mounting head 6, wherein the metal rings 1 are fixedly connected to a head of the glasses leg 10, the rotating shaft 4 is arranged in the metal rings 1, the leaf spring 8 is arranged at the head of the glasses leg 10, the leaf spring 8 is located below the rotating shaft and the mounting head 6 is connected with the rotating shaft 4.

Wherein, metal ring grooves 5 are formed in the metal rings 1, a rotating shaft groove 3 is formed in a side surface of the rotating shaft 4, and a gap 9 exists between the leaf spring 8 and the glasses leg 10. A mounting head end surface 2 is matched with the rotating shaft groove 3, and the width of a main body of the mounting head 6 is equal to the depth of the rotating shaft groove 3. a mounting head upper body 7 arranged on the mounting head 6 is connected with a glasses frame. The width W1 of the head of the mounting head 6 is equal to the width W2 of the rotating shaft groove 3.

Figure 2:
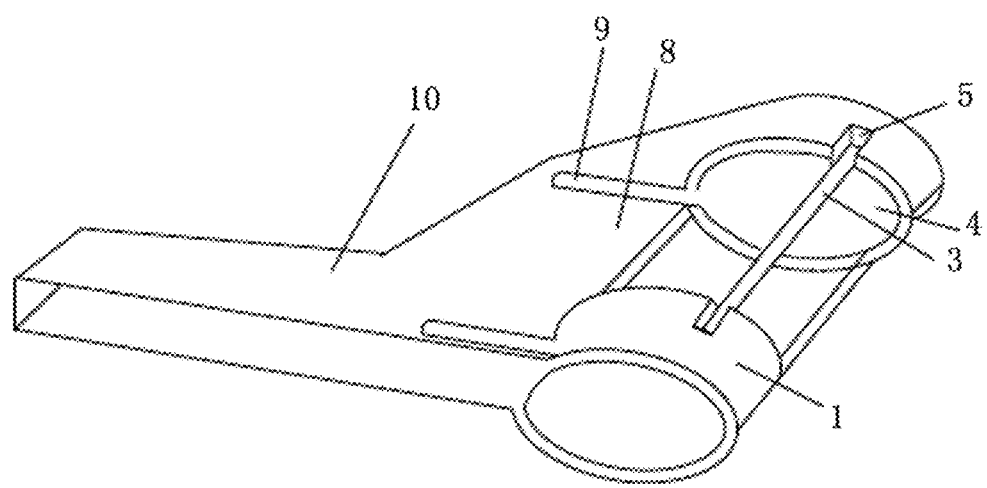
FIG. 2 is a structural schematic view of a glasses leg and a rotating shaft of the present invention.

The specific implementation processes of the present invention are as follows:

As shown in FIG. 2, the metal rings 1, the leaf spring 8 and the metal ring grooves 5 are arranged at the head of the glasses leg 10.

Figure 3:
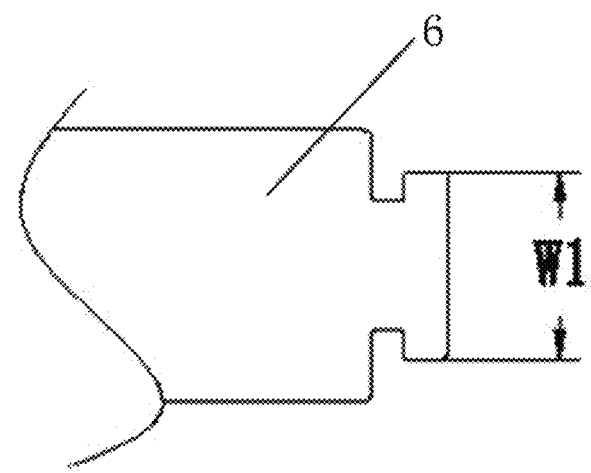
FIG. 3 is a structural schematic view of a mounting head of the present invention.
Figure 4:
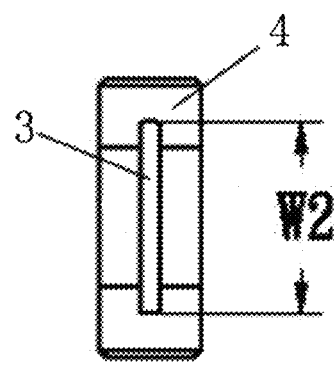
FIG. 4 is a structural schematic view of a rotating shaft of the present invention.
Figure 5:
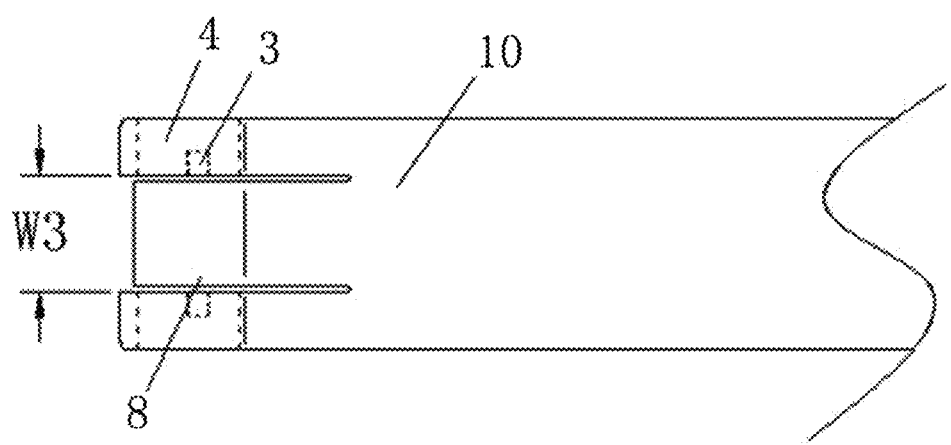
FIG. 5 is a structural schematic view of a head of a glasses leg of the present invention.

The rotating shaft 4 is inserted into the metal rings at the head of the glasses leg 10. The rotating shaft 4 can be inserted since the width W1 of the head of the mounting head 6 is equal to the width W2 of the rotating shaft groove 3, as shown in FIG. 3, FIG. 4 and FIG. 5. Then the rotating shaft 4 is rotated to enable the rotating shaft groove 3 and the two metal ring grooves 5 at the head of the glasses leg 10 to be in a line, as shown in FIG. 2.

Figure 6:
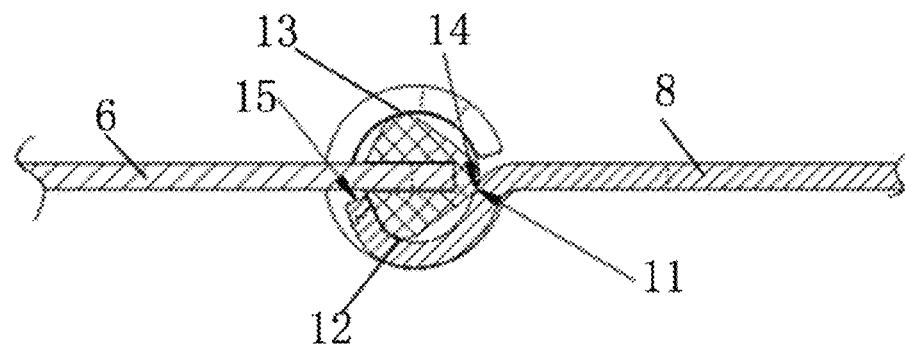
FIG. 6 is a schematic view when a mounting head and a glasses leg of the invention are in a line.

The mounting head 6 is inserted into the rotating shaft groove 3 and is outwards rotated to enable the mounting head 6 and the glasses leg 10 to be in a line, as shown in FIG. 2. Since at this moment, the leaf spring 8 has already pressed a first edge 11 and a second edge 12 of the rotating shaft 4 and a third edge 13 is pressed in the metal ring grooves, as shown in FIG. 6, the phenomenon that the rotating shaft 4 gets loose does not occur. In addition, since the width W1 of the head of the mounting head 6 is larger than the width W3 of the head of the glasses leg 10, as shown in FIG. 5, the phenomenon that the mounting head 6 is pulled out does not occur and the mounting head 6 can be pulled out only when the rotating shaft groove 3 and the metal ring grooves 5 are in a line, as shown in FIG. 2. After a glasses front frame is assembled, since a tail of the glasses leg 10 is blocked by the front frame or glass and consequently the rotating shaft groove 3 and the two metal ring grooves 5 of the glasses leg 10 cannot be in a line, the phenomenon that the mounting head 6 on the glasses frame is pulled out does not occur.

Figure 7:
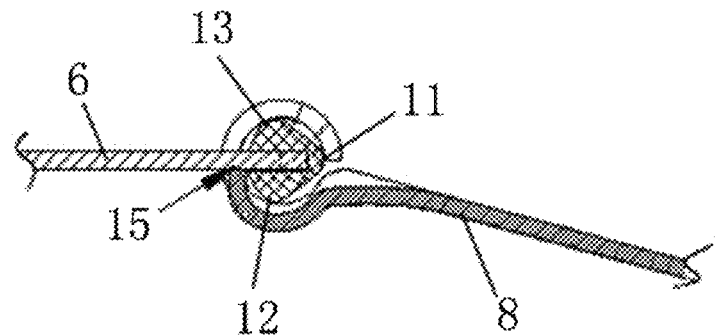
FIG. 7 is a schematic view of a principle of outward elastic force production of the present invention.

Principle of outward elastic force production: under the situation that the mounting head 6 has already been fixed, the glasses leg 10 is outwards pulled, an external end of the leaf spring 8 presses the mounting head 6, a leaf spring front end 15 of the glasses leg 10 is subjected to force at this moment since the leaf spring presses the mounting head 6, as shown in FIG. 7, the glasses leg 10 is continuously outwards pulled, the leaf spring front end 15 moves forwards on the surface of the mounting head 6, the leaf spring 8 is continuously pressed and thus elastic force is produced.

Figure 8:
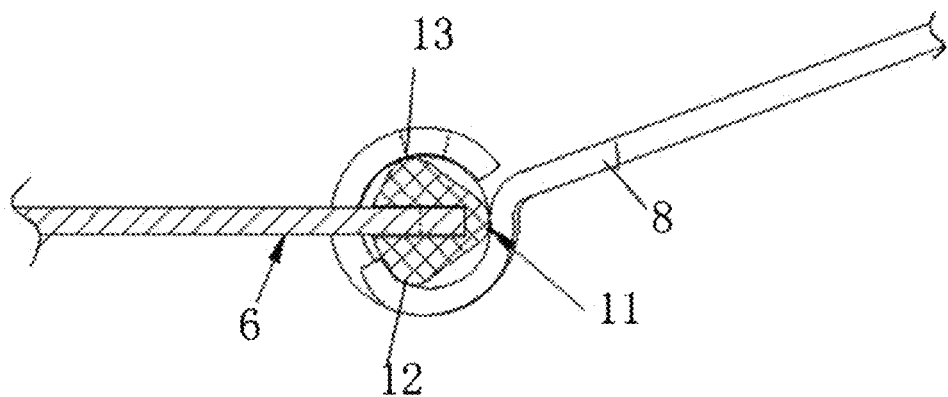
FIG. 8 is a schematic view of a principle of inward elastic force production of the present invention.

Principle of inward elastic force production: under the situation that the mounting head 6 has already been fixed, the glasses leg 10 is inwards pulled, an internal side of the tail end of the leaf spring 8 presses the first edge 11 of the rotating shaft 4, the leaf spring 8 of the glasses leg 10 is subjected to a force at this moment since the leaf spring presses the first edge 11 of the rotating shaft 4, as shown in FIG. 8, the glasses leg 10 is continuously inwards pulled, the internal side 14 of the tail end of the leaf spring is continuously pressed and thus elastic force is produced.

The glasses leg 10 is continuously inwards pulled, the internal side 14 of the tail end of the leaf spring is continuously pressed thus elastic force is always maintained. Till the moment when the glasses leg 10 and the mounting head 6 for an included angle of 90 degrees, since the tail of the glasses leg 10 is blocked by the front frame or glass, consequently the rotating shaft groove 3 and the two metal ring grooves 5 of the glasses leg 10 cannot be in a line and thus the mounting head 6 on the glass frame is not pulled out.

The above-mentioned embodiments are just the preferred embodiments of the present invention and are not used for limiting the present invention. Any modification, equivalent replacement, improvement, etc. made within the spirit and principle of the present invention shall be included in the range of the present invention.

The invention claimed is:

1. A glasses leg spring hinge structure, comprising:
   a glasses leg, two metal rings, a rotating shaft, a leaf spring and a mounting head,
   wherein the two metal rings are formed at the head of the glasses leg,
   wherein the rotating shaft is arranged between the two metal rings and on top of the leaf spring,
   wherein the leaf spring is formed at the head of the glasses leg between the two metal rings, wherein a gap is formed between the leaf spring and each metal ring,
   wherein a rotating shaft groove is formed in a side surface of the rotating shaft, wherein a metal ring groove is formed on each of the two metal rings, wherein the metal ring grooves are capable of being aligned with the rotating shaft groove, wherein the mounting head is T-shaped, wherein the width of the head of the mounting head is equal to the width of the rotating shaft groove, wherein the head of the mounting head can be inserted into the rotating shaft groove when the metal ring grooves and the rotating shaft grooves are aligned, wherein the mounting head cannot be removed from the rotating shaft groove when the metal ring grooves and the rotating shaft grooves are not aligned.

2. The glasses leg spring hinge structure according to claim 1, wherein the mounting head further comprising an upper body, where the upper body is connected with a glasses frame.

* * * * *